United States Patent [19]
Larsen

[11] Patent Number: 4,773,175
[45] Date of Patent: Sep. 27, 1988

[54] DISPLAY BOARD FOR A SHOPPING CART

[76] Inventor: Clifford A. Larsen, 2063 N. Spring, Mesa, Ariz. 85203

[21] Appl. No.: 818,099

[22] Filed: Jan. 13, 1986

Related U.S. Application Data

[63] Continuation-in-part of Ser. No. 631,248, Jul. 16, 1984, abandoned.

[51] Int. Cl.$^4$ .............................................. G09F 3/00
[52] U.S. Cl. ..................................................... 40/308
[58] Field of Search .......................... 40/308; 340/572; 280/33.99 A, 33.99 C

[56] References Cited

U.S. PATENT DOCUMENTS

| | | | |
|---|---|---|---|
| 1,116,942 | 11/1914 | Smith | 40/308 |
| 2,273,474 | 11/1955 | Minter | 40/308 |
| 2,895,243 | 7/1959 | Hummer et al. | 40/308 |
| 3,024,554 | 3/1962 | Kempher | 40/308 |
| 3,609,741 | 9/1971 | Miller | 340/572 |
| 3,956,841 | 5/1976 | Hensel | 40/308 |
| 4,156,318 | 5/1979 | Economy | 280/33.99 A |
| 4,217,711 | 8/1980 | Spresser et al. | 40/308 |

FOREIGN PATENT DOCUMENTS

| | | | |
|---|---|---|---|
| 2535017 | 2/1977 | Fed. Rep. of Germany | 40/308 |
| 1379128 | 1/1975 | United Kingdom | 280/33.99 A |
| 1493123 | 11/1977 | United Kingdom | 40/308 |

*Primary Examiner*—John J. Wilson
*Assistant Examiner*—Cary E. Stone
*Attorney, Agent, or Firm*—H. Gordon Shields

[57] ABSTRACT

A display board that may be mounted on a shopping cart is presented. A large sheet of preferably plastic material is folded to form a display board which fits over wire rods of a shopping cart. One side of the display board is used as a store directory. Indicia may be printed on the one side of the board to indicate the items in the store and the locations of the items. Alternatively, pieces of paper with adhesive backings may be used to indicate the store locations of the items instead of having the information printed on the board. The other side of the board may be used for advertising purposes. Advertising information may be printed on the board, or a paper with an adhesive backing may be used to display advertising information. A fastening device may be used to hold the two halves of the display board together.

12 Claims, 2 Drawing Sheets

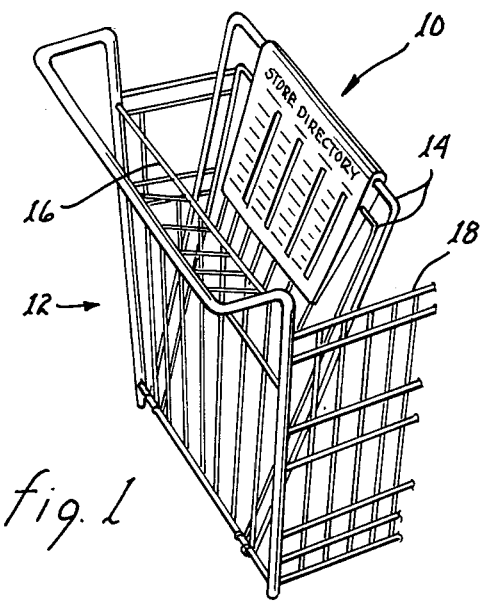
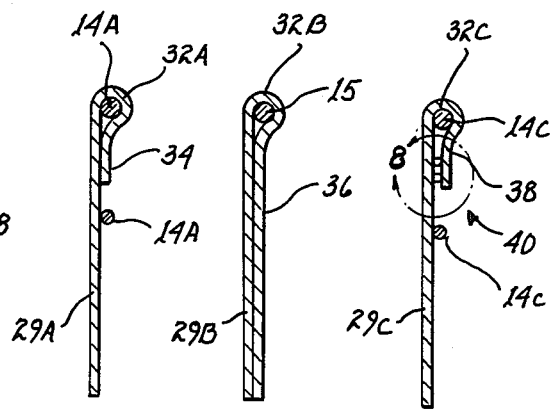
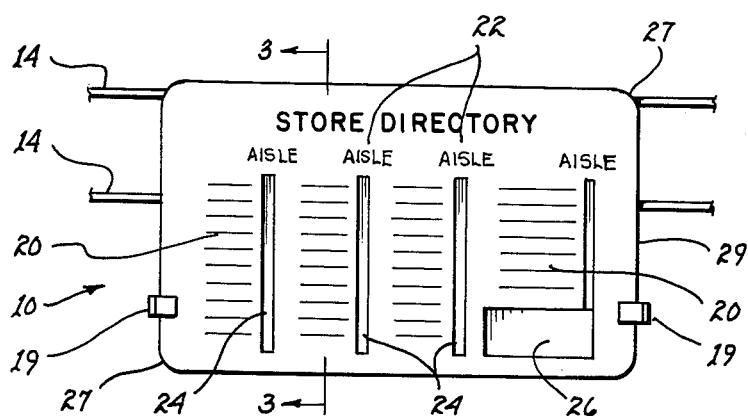
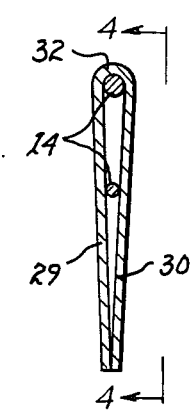
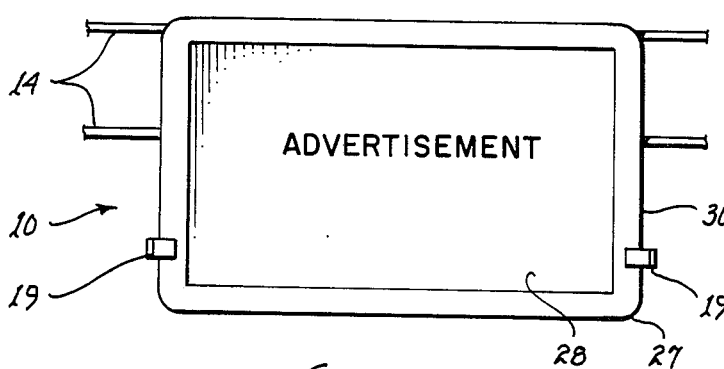
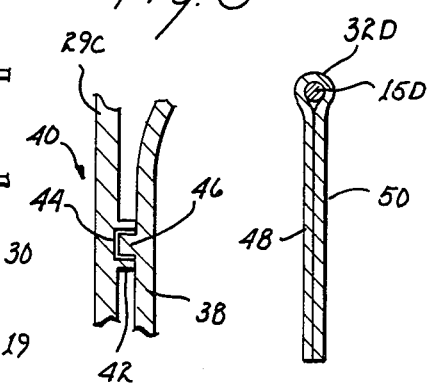

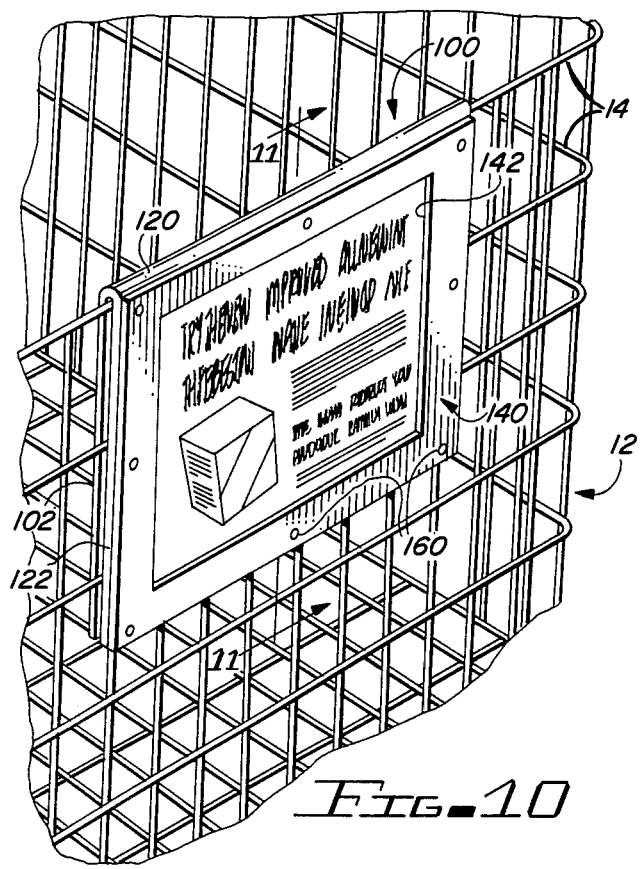
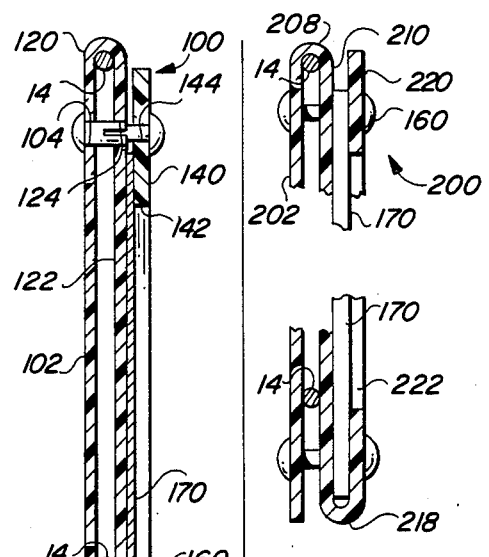
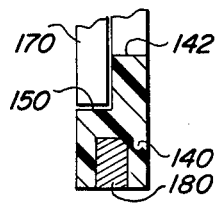
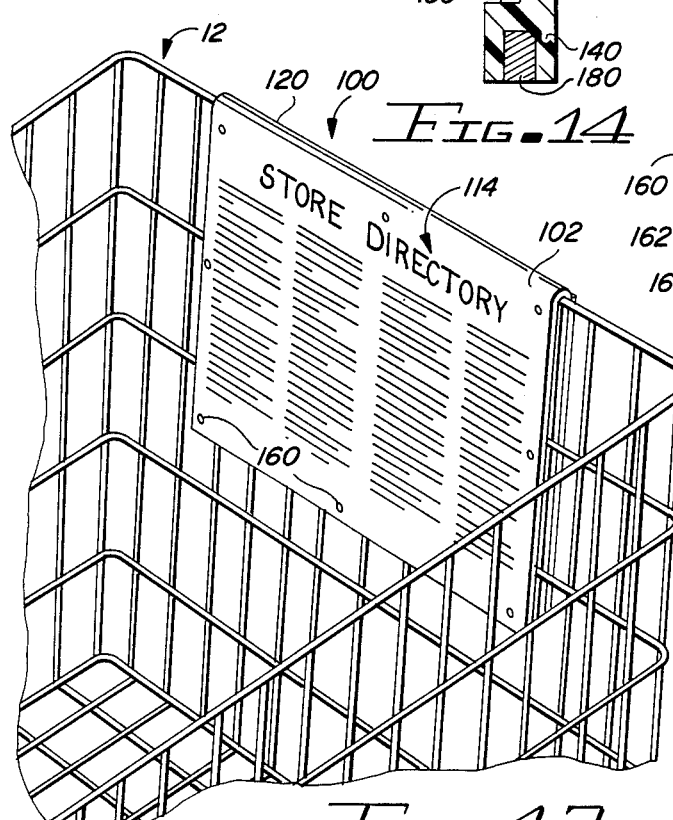
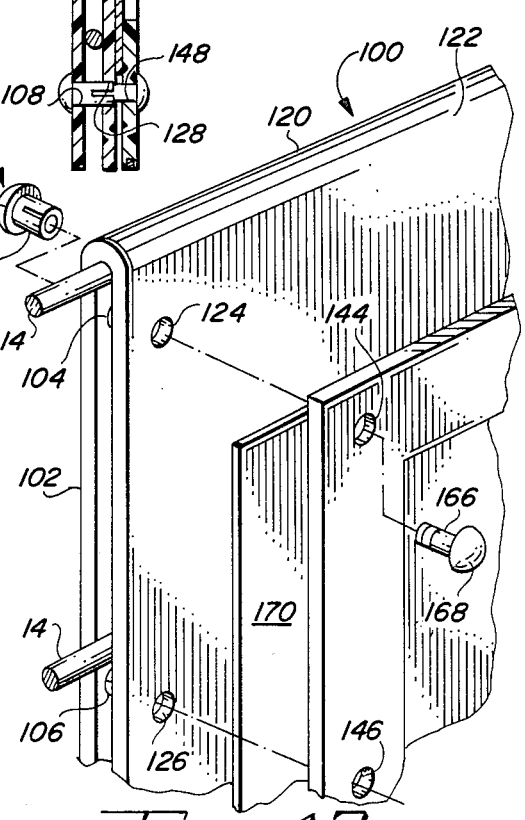

DISPLAY BOARD FOR A SHOPPING CART

CROSS-REFERENCE TO RELATED APPLICATION

This application is a continuation-in-part application of copending application Ser. No. 631,248, filed July 16, 1984, now abondoned.

BACKGROUND OF THE INVENTION

1. Field of the Invention

This invention relates generally to shopping cart display boards and, more particularly, to a shopping cart display board which may be removably attached to a shopping cart and used as a store directory and for displaying advertising.

2. Description of the Prior Art

Customers shopping in a large supermarket quite often experience difficulty in locating food and other items in the store due to the large number of aisles containing merchandise. As a result, a significant amount of time is wasted walking up and down aisles looking for desired items.

A store directory that may be attached to a shopping cart would allow customers to locate items by referring to the appropriate items and aisle locations listed on the directory. Such a directory could also be used for the purpose of alerting customers to special sales or to the locations of new items at the store. Preferably, the directory would allow the aisle locations to be changed as the items are moved from one aisle to another.

In addition, a display board attached to a shopping cart may be used for advertising purposes. As such, there is a need for a display board which may be used as a store directory and also for advertising purposes. In order that advertising may be properly displayed, the display board should have the capability of being removably attached to the front, rear and sides of a shopping cart.

Accordingly, there is a need for a display board which may be removably attached to a shopping cart and used as a store directory and for advertising purposes. The store directory should allow the aisle locations for the different items to be changed as the items are moved to different locations. Moreover, the display board should be capable of being attached to the front, rear, and sides of the shopping cart.

As far as prior art patents are concerned, the following is a brief discussion concerning known patents.

U.S. Pat. No. 1,116,942 discloses a sign secured to a wire fence. The sign, adapted for advertising purposes, comprises a single sheet folded in half so that one half is disposed on one side with a fence and the other half is disposed on the opposite side of the fence, with a middle, horizontally extending, fold line or crease disposed over the top wire of the fence. At the bottom portion of the sign, there are cutout portions extending through both panels of the sign for purposes of allowing a fastening element to extend through the panels and around the fence.

U.S. Pat. No. 2,687,589 discloses a rotating shopping guide supported on a push-cart handle.

U.S. Pat. No. 2,845,729 discloses a sign fastened to the swinging front end gate of a pushcart basket. The sign pops up into an open position when the basket or cart is not nested with other baskets or carts. The sign is in its down or retracted (closed) position when the basket is nested.

U.S. Pat. No. 2,864,189 discloses a holder for a shopper's shopping list which fastens to the handle of a shopping cart. The holder also includes advertising material.

U.S. Pat. No. 2,888,761 discloses a clipboard which fastens to the handle of a shopping cart. The apparatus is similar to the apparatus of the '189 patent, discussed above, but it also includes a pair of indentations along one edge, and it discloses clamping means secured adjacent to the indentations. The indentations define openings for a user's hands.

U.S. Pat. No. 2,895,243 discloses a sign holder having a pair of frames, and a sign is held between the frames.

U.S. Pat. No. 2,936,540 discloses what is referred to as an identification device for a television channel program. The device includes a background sheet and a front sheet disposed on the background sheet on which there are a plurality of openings or apertures. Within the openings or apertures, and secured to the background sheet, are signs, notes, pictures, etc., regarding programs that will be shown on the television channel for which the apparatus is advertising.

U.S. Pat. No. 3,251,543 discloses a shopping cart attachment which includes signs and an adding machine. The attachment fastens to the handle of a cart. Advertising space is included on the attachment. The attachment also includes a clipboard, an adding machine, and a store directory.

U.S. Pat. No. 3,677,570 discloses a display or advertising apparatus for the front end of a nestable shopping cart. The apparatus moves vertically upwardly and downwardly during nesting and use. The apparatus pops up for use, and it moves down for nesting when a second cart is contacted.

U.S. Pat. No. 3,782,747 discloses an advertising card for a shopping cart which includes integral tabs extending outwardly at the top and bottom of the card to fold over horizontal rods of the cart. The apparatus also uses adhesive fasteners to secure the card to the shopping cart.

U.S. Pat. No. 3,956,841 discloses a directory for a shopping cart. The directory comprises a single panel secured to a shopping cart. The purpose of the panel is to list or identify the various aisles or portions of the store in which various items may be located. The items are listed and the aisles are stated. The panel is secured to the wires of the shopping cart by particular fastening elements, and the claims in the patent are drawn specifically to the brackets or elements used to secure the panels to the shopping cart.

U.S. Pat. No. 4,034,539 discloses a shopping cart nestable with the pivoting rear wall and child seat of a shopping cart. The apparatus is pivotally secured to the rear wall with an attachment which extends between the rear wall and the inner wall of a child's seat of the shopping cart. This patent is the parent patent of the '318 patent discussed immediately below.

U.S. Pat. No. 4,156,318 discloses an attachment for a shopping cart which extends between the fixed, rear portion of the shopping cart and the foldable or movable wall portion of the "baby seat" found on most shopping carts. The attachment, in addition to providing a writing surface, may also include advertising material, directory, etc. When the baby seat portion of the shopping cart is folded, the attachment also folds.

German Patent No. 2,535,017 discloses a shopping cart or basket which has a base plate holding an advertising plackard. The base plate is on the bottom of the cart or basket. The base plate includes a recess portion in which the plackard may be disposed.

SUMMARY OF THE INVENTION

The apparatus described and claimed herein comprises a folded double panel for securing to a shopping cart, and a third panel secured to the double panel and having a window for displaying information.

Among the objects of the present invention are the following:

To provide a new and improved display board for a shopping cart;

To provide a new and useful display board which may be attached to the shopping cart and used as a store directory;

To provide a new and useful display board for a shopping cart which contains certain information such as aisle locations which may be periodically changed;

To provide new and useful display board which may be attached to the shopping cart and used for advertising purposes;

To provide a new and useful display board which may be attached to the front, rear and sides of the shopping cart.

In accordance with one embodiment of this invention, a display board for mounting preferably on a shopping cart having a plurality of wire rods is disclosed which comprises a first rectangular-shaped sheet; a second rectangular-shaped sheet attached to the first rectangular-shaped sheet in order to allow the first and second sheets to operably engage the wire rods of the shopping cart; and directory means operably coupled to the first rectangular-shaped sheet for indicating a plurality of items of merchandise located in a store and the locations of the items. In this embodiment, a large sheet of preferably plastic material is folded (formed) in half to form a display board which fits over the wire rods of a shopping cart. One side of the display board is used as a store directory. Indicia may be printed on the board to indicate the items in the store and the locations of the items. Alternatively, pieces of paper with adhesive backings may be used to indicate the locations of the items instead of information printed on the board. The other side of the board may be used for advertising purposes. Advertising information may be printed on the board or paper with an adhesive backing used to display advertising information. A fastening device may be used to hold the two halves of the display board together if desired.

A second embodiment of the invention features a display board with a portion which folds over the wire rods of the shopping cart. A fastening device may be used to secure the board to the cart if desired.

The foregoing and other objects, features and advantages of this invention will be apparent from the following, more particular, description of the preferred embodiments of the invention, as illustrated in the accompanying drawings.

BRIEF DESCRIPTION OF THE DRAWING

FIG. 1 is a perspective view showing a display board attached to the rear end of a shopping cart.

FIG. 2 is a front view of the store directory side of the display board.

FIG. 3 is a cross-sectional view of the display board taken along line 3—3 in the direction of the arrows shown in FIG. 2.

FIG. 4 is a rear view of the advertising side of the display board.

FIG. 5 is a cross-sectional view of another embodiment of the display board with an overlapping portion taken in the same direction as FIG. 3.

FIG. 6 is a cross-sectional view of still another embodiment of the display board which fits over a single rod taken in the same direction as FIG. 3.

FIG. 7 is a cross-sectional view of still another embodiment of the display board with an overlapping portion and a fastening device taken in the same direction as FIG. 3.

FIG. 8 is an enlarged cross-sectional view of the fastening device circled in FIG. 7.

FIG. 9 is a cross-sectional view of still another embodiment of the display board which fits over a single rod taken in the same direction as FIG. 3.

FIG. 10 is a perspective view of an alternate embodiment of the apparatus of the present invention secured to a shopping cart.

FIG. 11 is a view in partial section of the apparatus of FIG. 10, taken generally along line 11—11 of FIG. 10.

FIG. 12 is a perspective view of an alternate embodiment of the apparatus of the present invention showing the opposite side of the apparatus from that shown in FIG. 10.

FIG. 13 is an exploded perspective view of a portion of the alternate apparatus of the present invention.

FIG. 14 is an enlarged fragmentary view in partial section of an alternate embodiment of a portion of the apparatus of the present invention.

FIG. 15 is a view in partial section of another alternate embodiment of the apparatus of the present invention.

DESCRIPTION OF THE PREFERRED EMBODIMENT

A display board, generally designated by reference number 10, is shown attached to a shopping cart 12 in FIG. 1. FIGS. 2 and 4 are front and rear views of the display board 10. The display board 10 has a generally rectangular front side 29 which may be used as a store directory and a generally rectangular rear side 30 which may be used for advertising purposes. The sides 29 and 30 of the display board 10 are bent or formed as shown in FIG. 3 to fit over a plurality of horizontal shopping cart rods 14 at the rear of the cart 12. The cart 12 also includes metal rods 16 and 18. The display board 10 is preferably made out of a rigid material such as plastic, or the like, that may be bent to form a curved portion 32. One or more elongated perforations or indentations (not shown) may be used to assist in bending or forming the display board 10. As such, the perforations or indentations may function as hinges.

Referring to FIG. 2, the store directory side 29 of the display board 10 has a number of indicia 20 indicating the food items and other merchandise located in a store. These indicia 20 are preferably printed or hot stamped on the side 29. However, any suitable way of imprinting or fixing the indicia 20 on the side 29 may be used. A plurality of columns with indicia 24 are also contained in the store directory side 29. The indicia 24 indicates the aisle locations in the store of the food items or other merchandise listed under indicia 20. The word "aisle" 22 is preferably imprinted or fixed at the top of each column containing indicia 24. Side 29 preferably has a blank area 26 for informing customers about any special sales or the locations of new items.

The columns containing indicia 24 and blank area 26 are preferably recessed or indented in order to allow pieces of paper or other material with adhesive backings (not shown) to be stuck to side 29 in the recessed areas of the columns 24 and blank area 26. As a result, the indicia 24 and information contained in the blank area 26 may be conveniently changed by removing the pieces of paper with adhesive backings containing old information and replacing them with pieces of paper containing new information. Individual pieces of paper indicating each aisle location or a strip of paper indicating all the locations in column 24 may be used. It is important to note that the store directory may be used with or without recessed areas. In fact, all of the information ("Aisle" 22 and indicia 20 and 24) may be permanently printed on side 29 if desired.

The other side 30 of the display board 10 may be used for advertising purposes. Side 30 preferably has a recessed or an indented area 28. Pieces of paper with adhesive backing (not shown) containing different advertising information may be stuck to side 30 within the recessed area 28. The advertising information may be changed by simply peeling off the piece of paper containing the old information and replacing it with another piece of adhesive paper containing new advertising information. Side 30 may be used without a recessed area 28 if desired. In addition, advertising information may be permanently printed or fixed on side 30 if desired.

As shown in FIGS. 2 and 4, the display board has rounded corners 27. However, the display board may be used with sharp corners if desired.

FIG. 3 is a cross-sectional view of the display board 10 shown in FIGS. 1, 2, and 4. Note how the display board 10 is formed with a curved portion 32 which fits over one of the shopping cart rods 14. The display board 10 may be removed from the shopping cart 12 by forcing the two sides 29 and 30 apart and fitting the board 10 over the rod 14. As a result, the display board 10 may be attached to the front, rear or sides of the shopping cart 12.

FIGS. 5, 6, 7, and 9 show other embodiments of the display board 10.

The embodiment shown in FIG. 5 has a folded portion 34 which is bent (formed) in such a way as to allow the display board 10 to engage the top rod 14A of the shopping cart 12. The folded portion 34 is joined to the side 29A by a fold or curved portion 32A which extends over the top rod 14A. The folded portion 34 may be pulled away from side 29A to allow the display board 10 to be removed from the cart 12.

In FIG. 6, the apparatus includes a pair of sides 29B and 36 folded from a single sheet of material. The juncture of the two sides 29B and 36 comprises a fold or curved portion 32B which receives a shopping cart rod 15. The curved portion 32B is disposed at the upper portion of the side 36, leaving the side 29B substantially planar.

FIG. 7 shows an embodiment that uses a fastening device 40 to removably attach a folded portion 38 of the display board 10 to side 29C.

An enlarged view of the fastening device 40 is shown in FIG. 8. As shown, folded portion 38 has an extension 46 which removably engages a groove or socket 44 cut into a second extension 42 attached to the inside portion of side 29C, facing the inside portion of side 30. As such, the folded portion 38 may be removably attached to side 29C, securing rod 14C inside the curved portion 32C. (See also FIG. 7.)

Fastening clips 19 are shown in FIGS. 2 and 4 holding the sides 29 and 30 together. However, it is important to note that the display board 10 may be used with or without the fastening clips 19 or fastening device 40. In addition, pop rivets, clamps, strip locks or any other type of device may be used in conjunction with the display board 10.

Another embodiment of the display board 10 is shown in FIG. 9. The embodiment of FIG. 9 includes two sides 48 and 50 folded over from a single sheet. The juncture of the sides 48 and 50 comprises a fold 32D which is symmetrical with respect to the sides 48 and 50. The fold 32D receives a shopping cart rod 15D. Note how the embodiments of FIGS. 6 and 9 may be attached to a single rod 15 and 15D, respectively.

FIG. 10 is a perspective view of an alternate embodiment 100 of the display board 10. The alternate embodiment 100 comprises display apparatus which includes three separate board or panel portions. As with the display board 10, the apparatus 100 is secured to the shopping cart 12, and particularly to horizontal rods 14 at the top of a cart side.

The display apparatus 100 includes three panels, including a front panel 102, a middle panel 122, and a rear panel 140. The front panel 102 and the middle panel 122 are connected together by an integral fold 120. The rear panel 140 is separate from the panels 102 and 122. All three of the panels are preferably rectangular in configuration. The terms "front" and "rear" as used in reference to the apparatus 100 refers to the directions as viewed by the operator of the cart 12. Thus, in a typical operation, when a user is pushing the cart 12, the user would be facing the "front" panel 102, and would accordingly be able to view store directory information or indicia, such as a directory indicia 114, shown in FIG. 12, disposed on the front panel 102.

The middle panel 122 is disposed between the front panel 102 and the rear panel 140, and has a two-fold purpose, as may be best understood in conjunction with FIGS. 11 and 13. A plurality of horizontally extending rods 14 of the shopping cart 12 are shown disposed between the front panel 102 and the middle panel 122. The apparatus 100 is secured to the horizontally extending rods of the cart 12 principally by the fold 120 being disposed over the topmost or uppermost horizontally extending rod 14. The other two rods 14, as shown in FIG. 11, are disposed between the panels 102 and 122. To a plurality of fasteners 160, which will be discussed in detail below, the apparatus is secured together and to the shopping cart 12. The integral fold or bend 120 is on the uppermost rod 14.

For receiving the fasteners 160, which may be appropriate two-piece plastic rivets, or the like, the front panel 102 includes a plurality of apertures 104, 106, and 108. The apertures 104 are located adjacent to the fold 120, the apertures 106 are preferably about in the middle of the panel 102, and the apertures 108 are preferably along the bottom of the panel 102. The middle panel 122 includes a plurality of aligned apertures corresponding to the apertures 104, 106, and 108. They include upper apertures 124, middle apertures 126, and lower apertures 128. Essentially, there are three rows of apertures.

The rear panel 140, which is also preferably rectangular in configuration and of the approximate size of the panels 102 and 122, includes a cut-out portion 142 through which an advertising sheet or element 170 is viewed. The aperture or cut-out portion 142 comprises a "window" through which the advertising sheet 170 may be observed, it may be considered as a "frame" which holds and thus displays the advertising sheet 170.

The rear panel 140 includes a plurality of apertures which also mate or are aligned with the apertures in the front panel 102 and the middle panel 122. They include a plurality of upper apertures 144, a plurality of middle apertures 146, and a plurality of lower apertures 148.

The fastening element 160 may be any appropriate type which is removable to allow the advertising sheet 170 to be periodically replaced by updated advertising material. On the other hand, the fasteners 160 are preferably not so easily removed that children, etc., could, without a substantial amount of effort, remove them. As best shown in FIG. 13, the fasteners 160 preferably include a rounded head 162, a tubular shank 164 extending outwardly from the head 162, a mating cylindrical shank 166 which extends into the tubular shank 164, and another head 168 secured to the shank 166. Such fastening elements are well known and understood in the art.

With the front and middle layers solid, the wires 14 of the shopping cart 12 are disposed between the two layers, and the advertising sheet or insert 170 is disposed against a solid back, namely the middle panel 122. The rear panel 140 then holds and displays the advertising sheet 170 agains the middle panel 122.

FIG. 14 is an enlarged view in partial section of a portion of the rear panel 140 showing a shoulder 150 disposed about the relieved portion 142 and on which the advertising sheet 170 is disposed. If desired, the panel 140 may include the shoulder 150. The shoulder 150 thus defines a particular rim in which the advertising panel 170 may be disposed for display purposes. It will be noted that the shoulder 150 is disposed about, or slightly apart from, the aperture 142. The use of the shoulder 150 would perhaps simplify the positioning and holding of the advertising sheet 170 relative to both the rear panel 140 and the middle panel or backing panel 122.

It will be noted that the advertising sheet 150 is generally not accessible to the view of the user of the cart apparatus 12. However, the advertising panel 170 is able to be viewed by the store patrons who are going in opposite directions to that of the cart 12. Thus, the user of a particular cart 12, while not able to view the panel 170 on the user's own cart, would be able to view the panel 170 on carts going in the opposite direction. Of importance to the user of any particular cart is, of course, the store directory, which would be facing any particular user.

If the apparatus 100 is secured to the very front portion of a shopping cart, when the cart is full of groceries, the store directory information or indicia 144 will be blocked. If the apparatus 100 is secured to the movable panel at the rear of the shopping cart, or the rear or back panel of the child's seat, then the store directory information 114 will be blocked by either a child disposed on the child's seat or else by groceries disposed in the compartment defined by the child's seat. Obviously, such advertising indicia may be viewed by slight movements of a child disposed therein, or by a careful positioning of any items disposed therein, if items are placed therein instead of a child being placed therein.

FIG. 15 is a view in partial section of another alternate embodiment of the apparatus of the present invention. Alternate embodiment 200, shown in FIG. 15, comprises three panels from a single sheet or blank of material. The three panels include a front panel 202, a middle panel 210, and a rear panel 220. The front panel 202 and middle panel 210 are connected by a bend 208. The bend 208 is disposed over a horizontal rod 14 of a shopping cart, such as the shopping cart 12 discussed above. Middle panel 210 and rear panel 220 are joined together by a bend 218. The rear panel 220 includes a cut-out or aperture portion 222 which comprises a frame for the advertising sheet 170. The three panels 202, 210, and 220 are appropriately secured together by a plurality of fasteners 160.

It will be noted that the interior or concave portion of the bend 218 between the middle panel and the rear panel 220 comprises a trough or platform in which the bottom of the advertising sheet 170 is disposed. The concave portion of the bend 218 accordingly helps to locate and hold the advertising sheet 170 to the appartus 200.

In the embodiments of both the display apparatus 100 and the display apparatus 200, the middle fasteners, which are disposed at the outer edges of the rear panels, obviously help to locate the advertising sheet or panel 170 relative to the apparatus 100, and particularly relative to the aperture 142 of the apparatus 100 and the aperture 222 of the apparatus 200. This is best shown or may best be understood from FIGS. 10, 12, and 13. As is best shown in FIGS. 10 and 12, there are three fasteners 160 in the top row, extending generally horizontally, and disposed adjacent to the fold 120. The middle row (horizontally) of fasteners includes only two fasteners, one at each outer edge of the apparatus 100. The bottom horizontal row of fasteners includes three fasteners, generally parallel with the top row. Both the top row and bottom row include fasteners at the outer edges, and thus aligned with each other, and with the middle row of fasteners, and fasteners generally centered, laterally or transversely, with respect to the outer sides or edges of the apparatus. Such a fastening arrangement has been shown to be satisfactory. Obviously, if more fastening elements are needed, they may be easily incorporated, as desired.

The apparatus of the present invention is preferably made of a plastic material, such as polyethylene. The permanent type printing, as the store directory indicia 20, 22, and 24 in FIG. 2, and the directory indicia 114 on FIG. 12, is preferably silkscreened onto the respective panels and then stabilized by well known ultraviolet procedures. Such procedures are, obviously, well known and understood.

When new goods are added, or the shelf arrangement is changed, the directory may be updated by the simple expediency of using pre-printed labels, as needed.

The shopping cart 12 shown in the drawing includes three fixed sides made of a plurality of horizontally extending wires or structural members 14 and a plurality of vertically extending wires or structural members. The rear of the cart 20 includes a movable rear side or panel typically used in shopping carts and which cooperates to make a seat on which to place an infant. The display board apparatus of the present invention, in each of its embodiments, is shown disposed over a side of the shopping cart, with an integral bend between a pair of adjacent panels disposed over the topmost horizontal rod of a side. It is obvious that, if desired, the apparatus of the present invention could be disposed on any of the four sides, rather that merely at the front side or the back side, as illustrated. It is also obvious that the apparatus of the present invention is applicable to shopping carts that are made of other than wire.

The apparatus is obviously adaptable to virtually any type of cart which includes any kind of a "side" over which the apparatus may be disposed or on which it may be secured. Obviously, a typical shopping cart of open basket type sides, with either three fixed sides and one movable rear side or else four fixed sides is preferable.

Again, while wire type construction may be preferred for shopping carts usable with the apparatus of the present invention, shopping carts made of plastic, which is generally thicker than the wire out of which a shopping cart is made, may also be utilized with the apparatus of the present invention. The plastic sides are still typically of "open weave" configuration. That is, while the plastic is integral, rather than made of a plurality of individual wires, open basket type sides are still provided.

In the case of "thicker" sides, as with shopping carts made of plastic, the integral bend 120 would simply have a greater radius of curvature to accommodate the extra thickness or width of the plastic sides. In addition, the fastening elements 160 would be longer.

Shopping carts are relatively expensive items, and it is not unusual for store patrons to remove carts from the parking lot area around the stores. For example, if a patron is walking, rather than driving, the patron may simply utilize the shopping cart as a convenient mode of transporting purchases to the patron's abode. It is unusual for a store to recover the carts thus taken. The apparatus of the present invention lends itself to the utilization of security measures to prevent that type of removal.

In FIG. 14 is shown an integrated circuit transmitter or transponder 180 disposed within the rear panel 140. When a cart goes outside of a specific predetermined perimeter, a monitor screen illuminates to advise the appropriate store personnel. There could be more than one transmitter or trandponder, if desired. The transponder or transmitter 180 is a security element which provides an electronic signal or electronic information to enable the security element to be tracked so that its whereabouts may be determined.

The development of integrated circuit elements makes the employment of transmitters or transponders, such as the transmitter or transponder 180, a relatively inexpensive item, and allows the item to be made in miniature so that concealment, such as in the apparatus of the present invention, is not difficult. Since the apparatus of the present invention is preferably plastic material, there is no interference with metallic shielding and the like. Also, the plastic material makes the insertion and concealment of a security device, such as the element 180, a relatively simple matter.

Typically, a monitor screen is utilized to track the removal of shopping carts by noting the removal of the shopping cart outside of preset or predetermined boundaries. The preset or predetermined boundaries are generally the parking lot, etc., used by store patrons. Thus, the apparatus of the present invention provides two kinds of information, visual information for store patrons, and electronic information for store security personnel.

If a transponder or transmitter element 180 were to be utilized with a metallic shopping cart, such as the shopping cart 12 illustrated in the drawing, the element would have to be disposed in plain sight. It could not be located in the handle, for example, due to the metallic shielding problem. At the same time, if a plastic shopping cart is used, such as discussed above, the problem of installation and removal of such security device would immobilize a shopping cart for a period of time. However, the utilization of the apparatus of the present invention is advantageous since it is easily installed and easily removed from a shopping cart, is easily handled for the installation and removal of a security device, and is relatively inexpensive, etc. As is obvious, more than one security device may be installed in a single display apparatus, if desired.

While the principles of invention have been made clear in illustrative embodiments, there will be immediately obvious to those skilled in the art many modifications of structure, arrangements, proportions, the elements, materials, and components used in the practice of the invention, and otherwise, which are particularly adapted for specific environments and operative requirements without departing from those principles. The appended claims are intended to cover and embrace any and all such modifications, within the limits only of the true spirit and scope of the invention. This specification and the appended claims have been prepared in accordance with the applicable patent laws and the rules promulgated under the authority thereof.

What I claim is:

1. Display apparatus for mounting on a shopping cart, having open basket type sides, comprising, in combination:

first panel means;

second panel means;

connecting means, including a first folded portion connecting the first panel means and the second panel means and disposed on a side of the shopping cart; and third panel means connected to the second panel means by a second folded portion and having a cutout portion for viewing a sheet disposed between the second and third panel means.

2. The apparatus of claim 1 in which the first panel means, the second panel means, and the third panel means are connected together and to the shopping cart by a plurality of fasteners.

3. The apparatus of claim 1 in which the first panel means includes first information printed thereon.

4. Display apparatus for displaying information on a shopping cart, having at least a single side, comprising, in combination:

panel means securable to the side of the shopping cart, including first panel means for displaying first information.

second panel means secured to the first panel means by a first bend portion, and third panel means secured to the second panel means by a second bend portion for displaying second information.

5. The apparatus of claim 4 in which the panel means further includes security means for providing electronic information for tracking the shopping cart.

6. The apparatus of claim 4 in which the second information is disposed between the second panel means and the third panel means.

7. The apparatus of claim 4 in which the second bend portion is remote from the first bend portion.

8. Apparatus for providing information on a shopping cart, comprising, in combination:

panel means secured to the shopping cart, including
  first panel means, including a first panel and a second panel secured to the first panel by a first bend portion, for displaying first visual information, and
  second panel means, including a third panel secured to the second panel by a second bend portion for displaying second visual information; and
security means secured to the panel means for providing electronic information on the location of the shopping cart.

9. The apparatus of claim 8 in which the third panel includes a cutout portion for displaying the second information.

10. The apparatus of claim 8 in which the panel means further includes fastening means for securing the first, second, and third panels together and to the shopping cart.

11. The apparatus of claim 8 in which the first bend portion is remote from the second bend portion.

12. The apparatus of claim 8 in which the third panel includes a cutout portion for displaying the second visual information.

* * * * *